July 24, 1928.

C. LEWANDO

ANTITHEFT DEVICE

Filed June 1, 1927

CHARLES LEWANDO
INVENTOR

BY Victor J. Evans
ATTORNEY

July 24, 1928.

C. LEWANDO

ANTITHEFT DEVICE

Filed June 1, 1927    2 Sheets-Sheet 2

1,678,440

CHARLES LEWANDO
INVENTOR

BY Victor J. Evans
ATTORNEY

Patented July 24, 1928.

1,678,440

UNITED STATES PATENT OFFICE.

CHARLES LEWANDO, OF BROOKLYN, NEW YORK.

ANTITHEFT DEVICE.

Application filed June 1, 1927. Serial No. 195,833.

This invention relates to improvements in anti-theft devices.

The primary object of the invention resides in an anti-theft device for automobiles for preventing an unauthorized person from making off with the automobile even though the engine of the same may be running, and which is accomplished by the use of a lock adapted to be set by the owner of the automobile before alighting therefrom, which prevents the engagement of the transmission gears after the clutch pedal has been depressed and released.

Another object of the invention is to provide a device for locking the clutch pedal in a depressed position after the same has been depressed to permit of the placing of the automobile in gear, and which automatically shuts off the ignition system to stop the motor, and simultaneously sounds an audible and displays a visible alarm.

A further object of the invention is the provision of an anti-theft device which may be applied to an automobile in a manner so as to conceal the same and not arouse the suspicion of a thief prior to his effort to place the automobile in motion.

A further object is to provide an anti-theft device which is simple in construction, easy to apply to an automobile and positive of operation.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1:
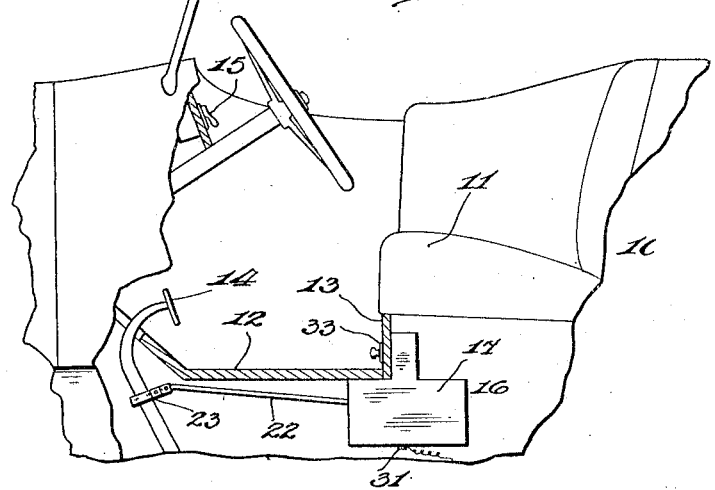
Figure 1 is a fragmentary vertical sectional view through the front body part of an automobile.
Figure 2:
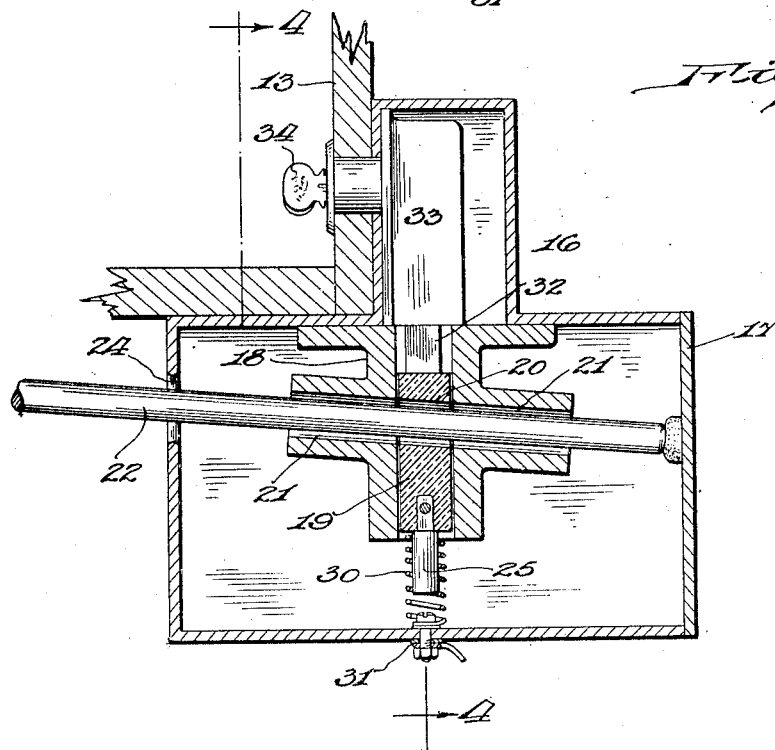
Figure 2 is an enlarged vertical sectional view through the clutch lock showing the position of the parts in an unlocked position.

Referring more particularly to the drawings, the reference numeral 10 designates a portion of an automobile, of which the following well known parts are pertinent to the application of my invention thereto, namely, a front seat 11, floor board 12, front board 13 of the seat, clutch pedal 14, and ignition switch 15, all of which are shown in Figure 1 of the drawings. My anti-theft device is shown in its entirety as at 16 and is supported from the floor board 12 or front board 13 in any suitable manner.

The device 16 comprises a casing 17 having spaced brackets 18—18 depending from the top wall thereof. Slidable between the brackets 18—18 is a block 19 of insulating material which is provided with an opening 20 for registration with openings 21 provided in the brackets to permit of the free sliding movement of a rod 22 pivotally attached to the clutch pedal 14 by a clamp 23. The rod extends through an opening 24 in the front wall of the casing and terminates short of the rear wall when the clutch pedal is in a normal position and the device is in an unset position. A metal rod 25 depends from the bottom of the block 19 and is pivoted thereto by a pin 26 having flat heads 27 and 28 disposed in recesses 29 provided on the inner face of the bracket 18. An expansible spring 30 encircles the rod 25 and has one end abutting the underside of the block 19 and the other end fixed to an electric terminal 31 provided in the bottom wall of the casing. It will be seen that the spring tends to push upward upon the block 19, but is prevented from movement when the device is in an unset position by the extended bolt 32 of a lock mechanism 33. The barrel of the lock extends through the board 13 to accommodate a key 34 for controlling the actuation of the bolt 32.

Figure 3:
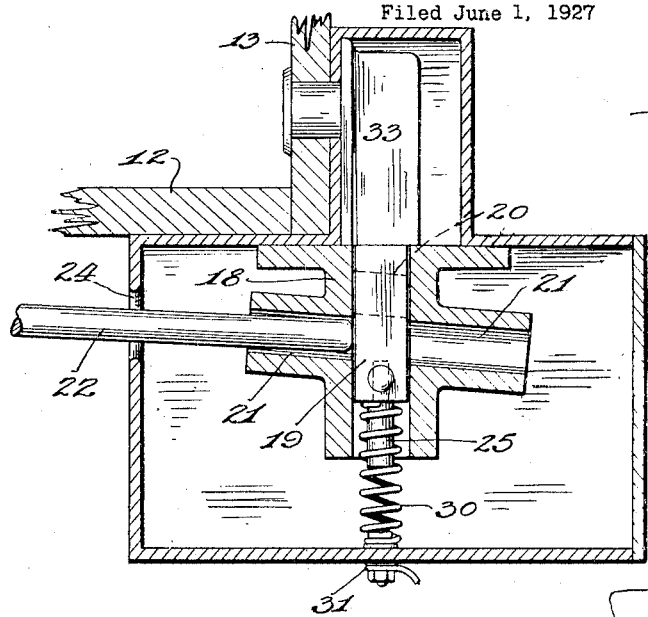
Figure 3 is a similar view but showing the clutch pedal locked in a depressed position.
Figure 4:
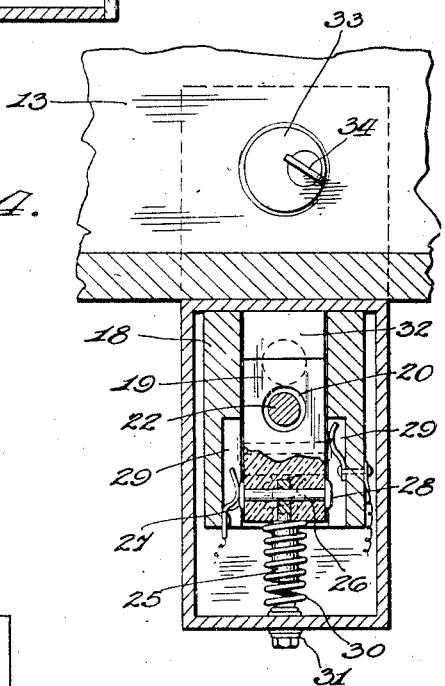
Figure 4 is a vertical transverse sectional view on the line 4—4 of Figure 2.
Figure 5:
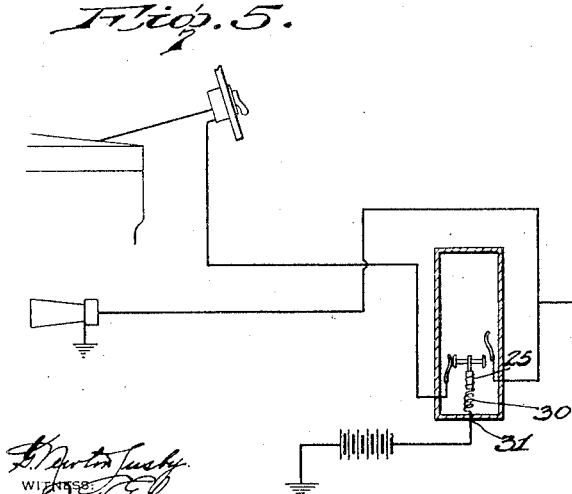
Figure 5 is a diagrammatic view of the electric circuit.

From the description thus far, a driver when alighting from his automobile will turn the key 34 to retract the bolt 32 and then remove the key from the lock. We shall presume that he has parked the automobile with the engine running, or that an unauthorized person has started the engine. In attempting to place the automobile in gear, the unauthorized person is compelled to depress the clutch pedal 14 which causes the movement of the end of the rod 22 to clear the block 19 as shown in Figure 3 of the drawings. As the free end of the rod clears the block, the spring 30 forces the block 19 upward so that the opening 20 is out of alignment with the openings 21 in the brackets. The end of the rod therefore abuts the block and is prevented from further movement which stops the return movement of the clutch pedal, thereby preventing the meshing of the driving or transmission gears. Before starting the automobile, the owner inserts the key 34 into the lock and extends the bolt 32 to cause the same to depress the block 19 against the action of the spring 30 to cause the opening 20 to register with the openings 21 whereupon the rod 22 is permitted to return to normal position.

For operation with the clutch lock, I employ a means for opening the ignition circuit of the automobile, and an audible and visible alarm which are operable upon depression of the clutch pedal when the clutch lock is set for operation.

Disposed within one of the recesses 29 in the block 19 is a spring contact 35 and which engages the head 27 of the contact pin 26 when the block is in a depressed position. This contact is connected with a wire 36 leading to the ignition switch 15 while the terminal 31 is connected with the battery 37 which parts are arranged in the ignition circuit 38. It will be seen that when the clutch lock is in an unset position, the ignition circuit is closed by the contacts 27 and 35, but should the clutch lock be actuated to allow the block 19 to move upward, the ignition circuit is opened which immediately shuts off the motor and the same cannot be started until the clutch lock is set to normal position.

Disposed within the other recess 28 at the top thereof is a spring contact 39 which is part of an alarm circuit 40 and with which the contact 28 engages to close the circuit. Also arranged in the alarm circuit 40 is a light 41 which may illuminate a sign such as "Thief" or the like, and the horn 42 of the automobile and the battery 37. When the clutch lock is in normal position, the alarm circuit is open but upon actuation of the same to lock the clutch pedal, the block 19 moves upward causing the contact head 28 to engage the contact 39 and close the circuit, thereby sounding the horn 42 and lighting the light 41 to attract the attention of the owner or police.

From the foregoing description, it will be seen that I have provided an efficient clutch lock and warning signal, which will prevent any movement of the car if an attempt is made to place the same in gear and which automatically shuts off the motor, if running, and attracts the attention of the police or owner, so that the culprit of the attempted theft may be caught.

While I have shown and described what I consider to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In an anti-theft device, the combination with the clutch pedal of a motor vehicle, a rod extending therefrom, a bearing for the free end of said rod, an obstructing member having an opening therein for registration with said bearing for the free passage of said rod therethrough, spring means acting against said obstructing member to move the same to an obstructing position, and key controlled mechanism for rendering said obstructing member responsive and unresponsive to the action of said spring means upon depression of said clutch pedal to a position to cause the free end of said rod to clear said opening.

2. An anti-theft device comprising a casing having a rod extending therein, said rod adapted to be attached to the clutch pedal of a motor vehicle for reciprocation within said casing, a pair of spaced bearings within said casing for receiving the free end of said rod, an obstructing block slidably mounted intermediate said bearings and having an opening therein for the passage of said rod, and spring means acting against said obstructing member to move the same to an obstructing position upon movement of said rod to a position to clear said opening.

3. An anti-theft device comprising a casing having a rod extending therein, said rod adapted to be attached to the clutch pedal of a motor vehicle for reciprocation within said casing, a pair of spaced bearings within said casing for receiving the free end of said rod, an obstructing block slidably mounted intermediate said bearings and having an opening therein for the passage of said rod, spring means acting against said obstructing member to move the same to an obstructing position upon movement of said rod to a position to clear said opening, and key controlled mechanism for preventing movement of said obstructing member against the action of said spring means to permit of the free movement of said rod in either direction.

In testimony whereof I hereby affix my signature.

CHARLES LEWANDO.